United States Patent Office 3,598,843
Patented Aug. 10, 1971

3,598,843
GLYCIDAMIDES
William E. Adcock, Ridgewood, N.J., assignor to
Shell Oil Company, New York, N.Y.
No Drawing. Filed May 28, 1968, Ser. No. 732,559
Int. Cl. C07d 1/20
U.S. Cl. 260—348                          12 Claims

ABSTRACT OF THE DISCLOSURE 2-phenylglycidamides such as 3-chloro-2-(2,4-dichlorophenyl)glycidamide, are described. The compounds have utility in the polymer field and also possess useful biological activity.

BACKGROUND OF THE INVENTION

Field of the invention

This invention is directed to novel compounds containing an oxirane ring. More particularly, the invention relates to certain novel and useful 2-phenylglycidamides.

Description of the prior art

While substituted glycidamides have been known for many years, relatively few 2-phenylglycidamides have been reported in the literature. As far as is known only 3-methyl-2-phenylglycidamide and 2,3-diphenylglycidamide have thus far been reported (Murray et al., J. Am. Chem. Soc., 56, 2749 (1934)).

SUMMARY OF THE INVENTION

It is an object of this invention to provide novel and useful 2-phenylglycidamides. It is another object to provide novel 2-phenylglycidamides possessing utility in the polymer field and having activity as nervous system depressants. Accordingly, this invention is a novel class of 2-phenylglycidamides.

DESCRIPTION OF THE PREFERRED EMBODIMENTS

The novel class of compounds of this invention can be described by the formula

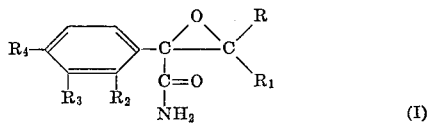

(I)

wherein R is chlorine, bromine or hydrogen; $R_1$ is chlorine, bromine, hydrogen or alkyl or 1-4 carbon atoms and $R_2$, $R_3$ and $R_4$, which may be the same or different, are fluorine, chlorine, bromine, hydrogen, trifluoromethyl or alkyl of 1-4 carbon atoms; with the provisos that at least one of $R_2$ and $R_4$ is chlorine or bromine and that when $R_1$ is alkyl, R is hydrogen.

The alkyl moieties may be straight or branched-chain and include methyl, ethyl, isopropyl, butyl and the like.

Exemplary compounds within this subclass include: when $R_2$ is chlorine or bromine;

3-chloro-2-(2-chlorophenyl)glycidamide,
3,3-dichloro-2-(2,3-dichlorophenyl)glycidamide,
3-bromo-2-(2,3-dichloro-4-propylphenyl)glycidamide,
3-ethyl-2-(2-chloro-3,4-difluorophenyl)glycidamide,
2-(2-bromo-4-ethylphenyl)glycidamide,
2-(2-chloro-3-methylphenyl)glycidamide,
2-(2,3-dichloro-4-fluorophenyl)glycidamide,
3-chloro-3-bromo-2-(2-chloro-4-propylphenyl)
 glycidamide,
2-(2-chlorophenyl)glycidamide,
3-methyl-2-(2-chloro-3-methylphenyl)glycidamide,
3-chloro-2-(2-chloro-3,4-dimethylphenyl)glycidamide,
2-(2-chloro-4-trifluoromethylphenyl)glycidamide,
3-chloro-2-(2-chloro-3-trifluoromethylphenyl)
 glycidamide, and the like;

when $R_4$ is chlorine or bromine;

2-(4-chlorophenyl)glycidamide,
2-(3,4-dichlorophenyl)glycidamide,
3-chloro-2-(4-bromophenyl)glycidamide,
3,3-dichloro-2-(2-methyl-4-chlorophenyl)glycidamide,
3-ethyl-2-(2-methyl-3,4-dichlorophenyl)glycidamide,
3-bromo-2-(3,4-dichlorophenyl)glycidamide,
3-chloro-2-(2-butyl-3,4-dichlorophenyl)glycidamide,
3-chloro-2-(2-fluoro-4-bromophenyl)glycidamide,
3-chloro-2-(2,3-difluoro-4-chlorophenyl)glycidamide,
3-chloro-2-(2,3-dimethyl-4-chlorophenyl)glycidamide,
3-chloro-2-(3-ethyl-4-bromophenyl)glycidamide,
3-bromo-2-(2-fluoro-3-methyl-4-chlorophenyl)
 glycidamide,
2(2-trifluoromethyl-4-chlorophenyl)glycidamide,
3-chloro-2-(3-trifluoromethyl-4-chlorophenyl)
 glycidamide, and the like;

and when $R_2$ and $R_4$ are chlorine or bromine;

2-(2,4-dichlorophenyl)glycidamide,
2-(2,3,4-trichlorophenyl)glycidamide,
2-(3-methyl-2,4-dichlorophenyl)glycidamide,
3-chloro-2-(2,4-dibromophenyl)glycidamide,
3-chloro-2-(3-fluoro-2,4-dichlorophenyl)glycidamide,
3,3-dichloro-2-(2,3,4-trichlorophenyl)glycidamide,
3-methyl-2-(2,4-dichlorophenyl)glycidamide,
3-butyl-2-(3-methyl-2,4-dichlorophenyl)glycidamide,
2-(2,4-dichloro-3-trifluoromethylphenyl)glycidamide,
3-chloro-(2,4-dichloro-3-trifluoromethylphenyl)
 glycidamide, and the like.

Within the 2-phenylglycidamides of Formula I, a particularly preferred subclass because of their activity as nervous systems depressants, especially as sedatives, hypnotics and anticonvulsants, are those where R is hydrogen or chlorine, preferably hydrogen, $R_1$ is hydrogen, chlorine or bromine, preferably chlorine, $R_2$ is chlorine or methyl, $R_3$ is hydrogen or chlorine, preferably hydrogen, and $R_4$ is hydrogen, chlorine, fluorine or methyl, with the proviso that at least one of $R_2$ and $R_4$ is chlorine. This is the most preferred subclass of the compounds of the invention.

Preferred species are:

3-chloro-2-(2,4-dichlorophenyl)glycidamide
3-chloro-2-(2-chloro-4-fluorophenyl)glycidamide
3-chloro-2-(2-chlorophenyl)glycidamide
3-bromo-2-(2,4-dichlorophenyl)glycidamide
3-chloro-2-(2-methyl-4-chlorophenyl)glycidamide
3-chloro-2-(2-chloro-4-methylphenyl)glycidamide
2-(2,4-dichlorophenyl)glycidamide
3,3-dichloro-2-(2,4-dichlorophenyl)glycidamide When the compounds of the invention contain different atoms substituted at the 3-position, i.e., R and $R_1$ are different, two stereoisomers can exist. It is to be understood that these isomers as well as mixtures of the two are within the scope of this invention.

The 2-phenylglycidamides of the invention fluid utility in the polymer field. For example, they are especially advantageous as modifiers of epoxy resins, particularly the glycidyl polyether resins such as are described and claimed in U.S. 2,633,458 with which they can be mixed in proportions of about 1:10 to 1:1 and cured in the usual way to obtain products of controlled properties, especially as regards flexibility. Those 2-phenylglycidamides containing halogen have the additional advantage of acting as fire-retardants when mixed with such epoxy resins and cured.

The most preferred subclass, as previously described, are particularly valuable as nervous system depressants, especially a hypnotics, sedatives and anticonvulsants.

PREPARATION

The 2-phenylglycidamides of this invention, except for those of Formula I in which Y is alkyl of 1–4 carbon atoms, may be prepared by reaction of the appropriate α-(halomethyl)mandelamide with sodium hydroxide, sodium methoxide or sodium hydride. These α-(halomethyl)mandelamides, in turn, are readily prepared by the hydrolysis of the corresponding α-(halomethyl)mandelonitriles with 80–95% sulfuric acid at temperatures of from about 80–110° C., preferably about 95° C. The α-(halomethyl)mandelonitriles are prepared by the known method of reacting the corresponding 2-haloacetophenones with hydrogen cyanide in the presence of a small amount of potassium cyanide as catalyst.

The 2-haloacetophenones may be prepared by a variety of methods. Most may be prepared by the well known Friedel-Crafts acylation of the appropriately substituted benzene with acetyl chloride or the appropriate mono- or dihaloacetyl chloride. The 2-position of the appropriately ring-substituted acetophenone may be halogenated to form the 2,2-dihaloacetophenones using the appropriate halogen in formic acid. The 2,2,2-trihaloacetophenones may be prepared by the free-radical halogenation of the appropriate 2,2-dihaloacetophenone.

The 3-alkyl substituted 2-phenylglycidamide may be prepared by the alkaline peroxide oxidation of the appropriate β-alkylatroponitrile; these β-alkylatroponitriles, in turn, may be prepared by the base catalyzed condensation of the appropriate substituted benzylcyanide and aldehyde. These procedures are described more fully by Knowles et al., J. Am. Chem. Soc., 54, 2028 (1932) and Vigier et al., Bull. Soc. Chim. France, 677 (1963).

As previously mentioned, those 2-phenylglycidamides substituted by two different atoms at the 3-position are capable of existing in two geometrically isomeric forms. For purposes of this invention those isomeric pairs that were separated have been designated as either α or β. The β isomers were those that were the major component of the isomeric pair, generally were the lower melting, and had the longer chromatographic retention times on silica gel G. The α isomers conversely were the minor component of the isomeric pair and had shorter chromatographic retention times. The α isomers also tended to be more unstable relative to the β isomer of the pair. The stereochemical configurations of the α and β isomers were not determined.

The following examples are illustrative of the methods used to prepare the compounds of this invention. In these examples, "parts" means parts by weight unless otherwise expressly indicated, and parts by weight bear the same relationship to parts by volume as does the kilogram to the liter. All elemental analyses are based on percent by weight.

EXAMPLE I

Preparation of haloacetophenones (a) 2,2,2′,4′,5′-pentachloroacetophenone.—To a stirred slurry of 176 parts aluminum chloride in 218 parts 1,2,4-trichlorobenzene at 60° C. was added dropwise over 15 minutes 176 parts dichloroacetyl chloride. The reaction mixture was stirred at 85–90° C. for 4 hrs., cooled and poured into 2000 parts by volume of ice containing 100 parts by volume concentrated hydrochloric acid. The aqueous mixture was extracted with ether. The combined extracts were washed with 1 N hydrochloric acid, 5% aqueous sodium bicarbonate, saturated aqueous sodium chloride and then dried over anhydrous magnesium sulfate. Stripping of the solvent afforded 309 parts crude brown liquid which upon distillation gave 264 parts (76%) light yellow, 2,2,2′,4′,5′ - pentachloroacetophenone, B.P. 117–123° C. at 0.7 mm. The product was identified by infrared spectral analysis.

Analysis.—Calc'd for $C_8H_3Cl_5O$ (percent): Cl, 60.7. Found (percent): Cl, 61.3.

(b) 2,2,2′-trichloroacetophenone.—Chlorine gas was bubbled into a stirred solution of 68 parts 2′-chloroacetophenone in 240 parts by volume glacial formic acid at 30° C. containing a small amount of dissolved hydrogen chloride. The reaction was continued for 4 hours while the temperature slowly rose to 50° C. After standing overnight the reaction mixture was poured into water and the product was extracted with methylene chloride. The extracts were washed with 5% sodium bicarbonate solution and water, and dried with anhydrous magnesium sulfate. Solvent removal afforded 96 parts (98%) of slightly yellow liquid, 2,2,2′-trichloroacetophenone. The product was identified by infrared spectral analysis.

(c) 2,2,2,2′,4′-pentachloroacetophenone.—Chlorine gas was slowly added over 30 hrs. with stirring to 307 parts 2,2,2′,4′ - tetrachloroacetophenone undergoing ultraviolet irradiation. The reaction temperature was maintained at 155–160° C. The product was stripped under high vacuum to give 347 parts (100%) of the yellow liquid, 2,2,2,2′-4′-pentachloroacetophenone. The product was identified by infrared spectral analysis.

Analysis.—Calc'd for $C_8H_3Cl_5O$ (percent): Cl, 60.7. Found (percent): Cl. 61.2.

EXAMPLE 2

3-chloro-2-(2,4-dichlorophenyl)glycidamide (α and β isomers)

(a) 2,4 - dichloro-α-(dichloromethyl)mandelonitrile.— 2,2,2′,4′-tetrachloroacetophenone (202 parts) obtained by the usual Friedel-Crafts reaction from m-dichlorobenzene and dichloroacetyl chloride dissolved in 80 parts by volume of liquid hydrogen cyanide at 15° C. was treated with 15 drops of a freshly prepared potassium cyanide solution. A vigorous exothermic reaction occurred causing reflux of the hydrogen cyanide. After 15 minutes refluxing, 100 parts by volume of ether and 4 parts by volume of concentrated sulfuric acid were added. The ether and excess hydrogen cyanide were removed by distillation and the resultant solid was recrystallized from hexane: benzene (19.1) to give 187 parts of 2,4-dichloro-α-(dichloromethyl)mandelonitrile as a white solid melting at 93–95° C., identified by elemental analysis.

Analysis.—Calc'd for $NOCl_4C_9H_5$ (percent): N, 4.9; Cl, 49.8. Found (percent): N, 5.2; Cl, 50.0

(b) The nitrile from (a) above (300 parts) in 1000 parts by volume of 80% sulfuric acid was heated on a steam bath for 16 hours, cooled and poured over ice. The resultant gummy precipitate was dissolved in methylene chloride, dried and cooled to give 258 parts of 2,4 - dichloro-α-(dichloromethyl)mandelamide melting at 135–137° C. This was identified by infrared spectral analysis.

(c) To a stirred suspension of 2.4 parts of hexane-washed 50% sodium hydride-mineral oil suspension in 50 parts by volume anhydrous tetrahydrofuran was added all at once a solution of 15 parts of the amide from (b) above in 100 parts by volume of anhydrous tetrahydrofuran. An exothermic reaction occurred with hydrogen evolution and the formation of a white precipitate. The reaction mixture was stirred for six hours, poured into water, and extracted with ether. The ether extracts were washed with water, dried with anhydrous magnesium sulfate and the solvent was removed to afford a yellow viscous liquid. Recrystallization from methylene chloride/hexane gave 6 parts white crystals, M.P. 115–121° C., containing a mixture of two isomers in a 6:1 ratio. Chromatagraphic separation of the mixture followed by recrystallization gave 3.1 parts of the β isomer (melting at 122–123° C.) and 0.4 part of the α isomer (melting at 170–171.5° C.) of 3-chloro-2-(2,4-dichlorophenyl)glycidamide which were identified by elemental and infrared spectral analyses.

Analysis. Calc'd for $NO_2Cl_3C_9H_6$ (percent): N, 5.3; Cl, 39.9. Found for isomer (β)(M.P. 122–123° C.) (percent): N, 5.3; Cl, 39.7. Found for isomer (α) (M.P. 170–171.5° C.)(percent): N, 5.3; Cl, 39.7.

(d) To a stirred solution of 60.6 parts of the amide from (b) above in 175 parts by volume of anhydrous methanol was added dropwise a solution of 10.8 parts of sodium methoxide in 100 parts by volume of anhydrous methanol. The resulting solution was stirred at room temperature for six hours and allowed to stand overnight. The reaction mixture was poured into water and extracted with methylene chloride. The extracts were washed with water, dried with anhydrous magnesium sulfate and the solvent removed to afford a crude mixture of the two isomers as in method (c) above, which when chromatographed and recrystallized gave 34.3 parts of the β isomer, melting at 122–124° C. and 1.7 parts of the α isomer melting at 169.5–170° C., which were identified by nuclear magnetic resonance and infrared spectral analyses.

EXAMPLE 3

2-(2,4-dichlorophenyl)-3-propylglycidamide (a) 2,4-dichloro-β-propylatroponitrile.—To a stirred mixture of 37.2 parts 2,4-dichlorobenzyl cyanide and 29 parts butyraldehyde was added with cooling a methanolic potassium hydroxide solution prepared from 0.1 part potassium hydroxide and 50 parts by volume methanol. The reaction was heated to 60° C. for one hour, during which an additional 36 parts butyraldehyde was added. The mixture stood at room temperature for 2½ days. Addition of 85% phosphoric acid until acidic, stripping of the solvent and vacuum distillation afforded 17 parts (35%) of liquid 2,4-dichloro-β-propylatroponitrile, B.P. 125–128° C. at 0.05 mm.

*Analysis.*—Calc'd for $C_{12}H_{11}Cl_2N$ (percent): N, 5.8; Cl, 29.6. Found (percent): N, 5.6; Cl, 28.5.

(b) A stirred mixture of 6.0 parts of the nitrile of (a) above, 5 parts by volume 30% hydrogen peroxide, 10 parts by volume sodium carbonate solution and 30 parts by volume acetone were heated at 52° C. for 30 minutes. Cooling, filtration of the resultant white crystals and recrystallization from ethanol gave 3.5 parts of 2-(2,4-dichlorophenyl)-3-propylglycidamide, M.P. 161–162° C. The original filtrate afforded an additional 2.5 parts 2-(2,4-dichlorophenyl)-3-propylglycidamide, M.P. 160–161° C. from a hexane-benzene mixture. The total yield was 6.0 parts (88%).

Using the procedures of Examples 1–3 the following 2-phenylglycidamides were prepared. The results are summarized in Table I. The compounds are identified by the following formula:

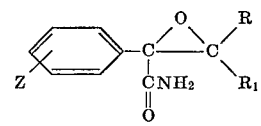

TABLE I

| Compound | Z | R | $R_1$ | Isomer | M.P. ° C. | Element | Calculated | Found |
|---|---|---|---|---|---|---|---|---|
| 4 | 2-Cl | H | Cl | β | 101–104 | N / Cl | 6.0 / 30.5 | 5.8 / 31.0 |
| 5 | 2-Cl | H | Cl | α | 165–168.5 | N / Cl | 6.0 / 30.5 | 5.8 / 31.0 |
| 6 | 4-Cl | H | Cl | β | 90.5–94 | N / Cl | 6.0 / 30.5 | 5.9 / 31.8 |
| 7 | 4-Cl | H | Cl | α | 112.5–113 | N / Cl | 6.0 / 30.5 | 5.9 / 31.8 |
| 8 | 4-Br | H | Cl | β | 108–109.5 | N / Cl / Br / Hal. Eq. | 5.1 / 12.8 / 28.9 / 138 | 4.8 / 14.5 / 28.2 / 134 |
| 9 | 4-Br | H | Cl | α | 102.5–104 | N / Cl / Br / Hal. Eq. | 5.1 / 12.8 / 28.9 / 138 | 4.7 / 13.0 / 31.8 / 134 |
| 10 | 2,5-Cl | H | Cl | β | 160–162 | N / Cl | 5.3 / 39.9 | 5.4 / 40.1 |
| 11 | 2,5-Cl | H | Cl | α | 175.5–177 | N / Cl | 5.3 / 39.9 | 5.2 / 40.6 |
| 12 | 2,3,4-Cl | H | Cl | β | 141.5–143 | N / Cl | 4.7 / 47.2 | 4.5 / 47.5 |
| 13 | Same | H | Cl | α | 192 | N / Cl | 4.7 / 47.2 | 4.6 / 47.0 |
| 14 | 2,4,5-Cl | H | Cl | β | 131.5–135 | N / Cl | 4.6 / 47.2 | 4.9 / 47.3 |
| 15 | Same | H | Cl | α | 162.5–166 | N / Cl | 4.6 / 47.2 | 4.5 / 48.1 |
| 16 | 2-Cl, 4-F | H | Cl | β | 96–102 | N / Cl | 5.6 / 28.4 | 5.6 / 28.2 |
| 17 | Same | H | Cl | α | 168–170 | N / Cl | 5.6 / 28.4 | 5.5 / 28.4 |
| 18 | 2,5-Cl | H | H | ------ | 186.5–190 | N / Cl | 6.0 / 30.6 | 6.2 / 29.1 |
| 19 | 2,4-Cl | H | H | ------ | 124–127 | N / Cl | 6.0 / 30.6 | 5.9 / 30.5 |
| 20 | 2,4-Cl | H | Br | β | 139–140.5 | N / Cl / Br / Hal. Eq. | 4.5 / 22.8 / 25.7 / 103 | 4.3 / 24.0 / 25.3 / 103 |
| 21 | 2,4-Cl | H | Br | α | 144–145 | | | |
| 22 | 2,4-Cl | H | n-$C_3H_7$ | ------ | 161–162 | C / H / Cl | 52.5 / 4.8 / 25.9 | 53.4 / 5.0 / 25.9 |
| 23 | 2,4-Cl | Cl | Cl | ------ | 106–106.5 | N / Cl | 4.7 / 47.2 | 4.8 / 46.8 |
| 24 | 2-$CH_3$, 4-Cl | H | Cl | β | 96.0–99.0 | N / Cl | 5.7 / 28.8 | 5.7 / 28.7 |
| 25 | Same | H | Cl | α | 112.5–114.5 | N | 5.7 | 5.5 |
| 26 | 2-Cl, 4-$CH_3$ | H | Cl | β | 98.5–100.5 | N¹ / C | 5.7 / 28.8 | 5.3 / 28.6 |
| 27 | Same | H | Cl | α | 140.0–141.5 | N | 5.7 | 5.0 |

NERVOUS SYSTEM DEPRESSANT ACTIVITY

The hypnotic activity of these glycidamides was noted as follows. Mice were orally intubated with 500 mg./kg.[1] of the test compound and observed at 15 minutes, 1 hour, 2 hours, 4 hours and 24 hours. Pharmacotoxic signs, especially onset and termination of the loss of righting reflex, were noted. Any compound inducing a loss in the ---
[1] Mg./kg. in these tests refers to milligrams of test compound per kilogram of animal body weight.

righting reflex in 50 percent of the mice at any of these test intervals was considered active and were tested at lower oral doses and/or by intraperitoneal injection. Two reference drugs, Glutethimide and sodium pentobarbital, were included in the tests as controls. The results of the tests are shown in Table II.

TABLE II

| Test compound:[1] | Oral | | Hypnotic activity intraperitoneal rating[2] at 180 mg./kg. |
|---|---|---|---|
| | Approximate lethal dose, mg./kg. | Approximate hypnotic dose, mg./kg. | |
| 2β | >500 | 62 | ++++ |
| 4 | 500 | 250 | ++++ |
| 17 | >500 | 500 | +++ |
| 21 | >500 | 500 | ++++[3] |
| 24 | | | ++++ |
| 25 | | | ++[4] |
| 29 | >500 | Inactive | ++[5] |
| 30 | >500 | 250 | ++++ |
| 31 | | | ++ |
| 32 | >500 | Inactive | ++++ |
| Glutethimide | 560 | 180 | ++[4,6] |
| Pentobarbital-Na | 500 | 125 | ++++[7] |

[1] 2β refers to beta isomer prepared in Example 2; other numbers refer to compounds of Table I.
[2] +=1-2 mice, ++=3-6 mice, +++=7-9 mice and ++++=10 mice out of 10 exhibited hypnotic activity.
[3] 9 out of a total of 9 mice tested exhibited hypnotic response.
[4] At 100 mg./kg., not tested at 180 mg./kg.
[5] 2 out of a total of 5 mice tested exhibited hypnotic response.
[6] Based on mean response of 11 groups of 10 animals.
[7] All mice died.

In addition to the hypnotic activity, compound 2β was also shown to exhibit other nervous system depressant effects. These include minor tranquilizing activity as shown by the pernicious preening test of Wilfon, J. G. et al., Fed. Proc., 19, 20 (1960); skeletal muscle relaxant activity as shown by antagonism to the lethal effect of intravenous injection of styrchnine sulfate; and, lastly, antagonism of supra-maximal electroshock seizure test of Swinyard, E. A., J. Am. Pharm. Assoc. 38, 201 (1949). The results of these tests are shown in Table III in comparison with the reference compounds, Glutethimide and sodium pentobarbital. The data show that compound 2β is more active and also has a greater safety factor (i.e. the ratio of $LD_{50}:ED_{50}$ is larger) than the two reference compounds.

TABLE III

| Test compound | Minor tranquilizing activity, i.p. | | Antistrychnine activity, i.p. mg./kg. | | Maximal electro-shock, i.p. mg./kg. | | i.p. $LD_{50}$, mg./kg. |
|---|---|---|---|---|---|---|---|
| | $ED_{50}$ (mg./kg.) | $LD_{50}/ED_{50}$ | $ED_{50}$ (mg./kg.) | $LD_{50}/ED_{50}$ | $ED_{50}$ (mg./kg.) | $LD_{50}/ED_{50}$ | |
| 2β | 36.5 | 14 | 24.7 | 21 | 24.7 | 21 | 510 |
| Glutethimide | >100 | <5.6 | 75 | 7.5 | | | 560 |
| Pentobarbital-Na | >56 | <2.3 | 39 | 3.3 | 39 | 3.3 | 130 |

I claim as my invention:
1. A 2-phenylgylcidamide of the formula

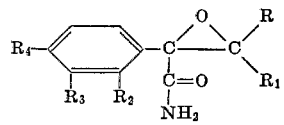

wherein R is chlorine, bromine or hydrogen, $R_1$ is chlorine, bromine, hydrogen or alkyl of 1–4 carbon atoms and $R_2$, $R_3$ and $R_4$, which may be the same or different, are fluorine, chlorine, bromine, hydrogen, trifluoromethyl or alkyl of 1–4 carbon atoms; with the provisos that at least one of $R_2$ and $R_4$ is chlorine or bromine and that when $R_1$ is alkyl, R is hydrogen.

2. The 2-phenylglycidamide of claim 1 wherein R is hydrogen or chlorine, $R_1$ is hydrogen, chlorine or bromine, $R_2$ is chlorine or methyl, $R_3$ is hydrogen or chlorine, and $R_4$ is hydrogen, chlorine, fluorine or methyl; with the proviso that at least one of $R_2$ and $R_4$ is chlorine.

3. The 2-phenylglycidamide of claim 2 wherein $R_3$ is hydrogen.

4. The 2-phenylglycidamide of claim 3 wherein R, $R_1$, $R_2$ and $R_4$ are chlorine.

5. The 2-phenylglycidamide of claim 3 wherein R and $R_1$ are hydrogen and $R_2$ and $R_4$ are chlorine.

6. The 2-phenylglycidamide of claim 3 wherein R is hydrogen and $R_1$ is chlorine.

7. The 2-phenylglycidamide of claim 6 wherein $R_2$ and $R_4$ are chlorine.

8. The 2-phenylglycidamide of claim 6 wherein $R_2$ is chlorine and $R_4$ is fluorine.

9. The 2-phenylglycidamide of claim 6 wherein $R_2$ is chlorine and $R_4$ is hydrogen.

10. The 2-phenylglycidamide of claim 6 wherein $R_2$ is methyl and $R_4$ is chlorine.

11. The 2-phenylglycidamide of claim 6 wherein $R_2$ is chlorine and $R_4$ is methyl.

12. The 2-phenylglycidamide of claim 3 wherein R is hydrogen, $R_1$ is bromine and $R_2$ and $R_4$ are chlorine.

References Cited

UNITED STATES PATENTS

| 2,493,090 | 1/1950 | Shelton et al. | 260—348 |
| 2,920,079 | 1/1960 | Hudson | 260—348 |

OTHER REFERENCES

Murray et al., Jour. Am. Chem. Soc., vol. 56, December 1934, pp. 2749–2751.

Chemical Abstracts, vol. 53 (1959) p. 10163.

NORMA S. MILESTONE, Primary Examiner

U.S. Cl. X.R.

424—278; 260—30.4, 465, 559, 592, 834